(12) United States Patent
Liu et al.

(10) Patent No.: US 10,415,200 B2
(45) Date of Patent: Sep. 17, 2019

(54) LOW-IMPACT WATER CONSERVING DAM

(71) Applicant: Xiaojun Liu, Shenzhen (CN)

(72) Inventors: Xiaojun Liu, Shenzhen (CN); Caixia Wang, Shenzhen (CN); Junlong Liu, Shenzhen (CN)

(73) Assignee: Xiaojun Liu, Shenzhen (CN)

( * ) Notice: Subject to any disclaimer, the term of this patent is extended or adjusted under 35 U.S.C. 154(b) by 0 days.

(21) Appl. No.: 16/147,605

(22) Filed: Sep. 29, 2018

(65) Prior Publication Data

US 2019/0242083 A1    Aug. 8, 2019

(30) Foreign Application Priority Data

Feb. 8, 2018    (CN) .......................... 2018 1 0129923

(51) Int. Cl.
| | |
|---|---|
| *A01G 9/02* | (2018.01) |
| *E02B 3/10* | (2006.01) |
| *E02B 3/14* | (2006.01) |

(52) U.S. Cl.
CPC .................. *E02B 3/10* (2013.01); *A01G 9/02* (2013.01); *E02B 3/14* (2013.01)

(58) Field of Classification Search
CPC ................ E02B 3/10; E02B 3/14; A01G 9/02
See application file for complete search history.

(56) References Cited

U.S. PATENT DOCUMENTS

| | | | | | |
|---|---|---|---|---|---|
| 2,058,934 | A | * | 10/1936 | Yohe ......................... | A01G 9/02 47/31 |
| 4,288,175 | A | * | 9/1981 | Baker ........................ | E02B 3/12 405/117 |
| 2005/0155287 | A1 | * | 7/2005 | Phillips ..................... | A01G 9/02 47/66.1 |
| 2009/0031629 | A1 | * | 2/2009 | Riesterer .................. | A01G 9/02 47/66.7 |
| 2014/0314487 | A1 | * | 10/2014 | Hill .......................... | E01F 8/0076 405/107 |
| 2018/0242531 | A1 | * | 8/2018 | Berry, III .................. | A01G 9/24 |
| 2018/0359957 | A1 | * | 12/2018 | Millar ...................... | A01G 7/045 |

FOREIGN PATENT DOCUMENTS

| | | | | | |
|---|---|---|---|---|---|
| CA | 2996193 | A1 | * | 4/2018 | ......... E02D 29/0208 |
| DE | 102006023588 | B3 | * | 9/2007 | ............. D04B 21/16 |
| WO | WO-2015023158 | A1 | * | 2/2015 | ............... A01G 9/02 |
| WO | WO-2017170583 | A1 | * | 10/2017 | ............... A01G 7/00 |

* cited by examiner

*Primary Examiner* — Benjamin F Fiorello

(57) ABSTRACT

A low-impact water conserving dam includes a dam body and reinforcing ribs arranged on a rear portion of the dam body. The reinforcing ribs comprise transverse reinforcing ribs and vertical reinforcing ribs interlaced with the transverse reinforcing ribs. A front portion of the dam body is an inclined surface and a rear end of the dam body is a platform surface. A planting bin is arranged on the platform surface of the dam body for planting vegetation. A plurality of water flow through holes are arranged in a matrix manner at a bottom of the planting bin. A water storage bin is arranged in an interior of the dam body. The water flow through holes are communicated with the water storage bin. A water drainage channel communicated with the water storage bin is formed in a middle upper portion of the inclined surface of the dam body.

6 Claims, 3 Drawing Sheets

LOW-IMPACT WATER CONSERVING DAM

BACKGROUND

Field

The present disclosure relates to the field of low-impact water conserving dam technology and more particular to a low-impact water conserving dam capable of having reasonable structural design, high reliability, high intelligence, and greatly reduces construction materials and costs.

Description of Prior Art

Dams are often built in rivers, ponds, reservoirs, and coasts to protect hydro-junction, river embankments, and ocean shores from flooding or scouring of tidal water, prevent silt from blocking rivers, and further prevent soil erosion and protect vegetation. The dams are protected by pouring concrete or stonework in the side slope or scalp. However, the above method not only has high construction costs, but also has complicated construction, large work quantity, and very tedious. A general method is to simply lay stones and pile stones to form a protective wall. Although the protective wall play a protective barrier, the protective wall still has some deficiencies in the performance, which cannot meet actual requirements better.

SUMMARY

In order to overcome existing problems in the prior art, the present disclosure provides a low-impact water conserving dam capable of having reasonable structural design, high reliability, and high intelligence, and greatly reduces construction materials and costs.

Compared with the prior art, the present disclosure of the low-impact water conserving dam comprises a dam body and reinforcing ribs arranged on a rear portion of the dam body. The reinforcing ribs comprise transverse reinforcing ribs and vertical reinforcing ribs interlaced with the transverse reinforcing ribs. A planting bin is arranged on a platform surface of the dam body for planting vegetation. A water storage bin is arranged in an interior of the dam body. In actual use, the present disclosure of the low-impact water conserving dam is able to greatly improve service life, and has rich functions and can meet various requirements. The reinforcing ribs on the rear portion of the dam body is able to significantly improve overall strength and enhance use.

DETAILED DESCRIPTION OF PREFERRED EMBODIMENTS

To make the objects, technical proposals and merits of the present disclosure more apparent, the present disclosure will be further described in detail with reference to the drawings and embodiments. It should be understood that the embodiments described here are only used to illustrate the present disclosure and are not intended to limit the present disclosure.

Figure 1:
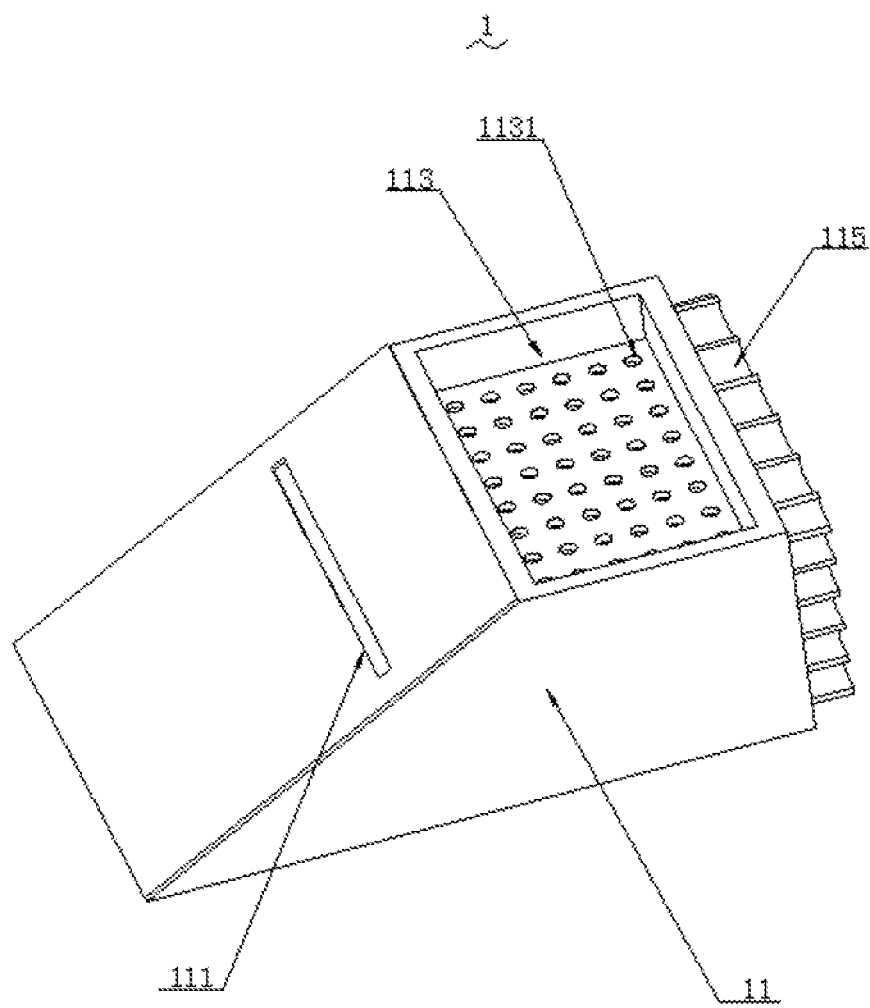
FIG. 1 is a perspective view showing a structural diagram of a low-impact water conserving dam of the present disclosure.
Figure 2:
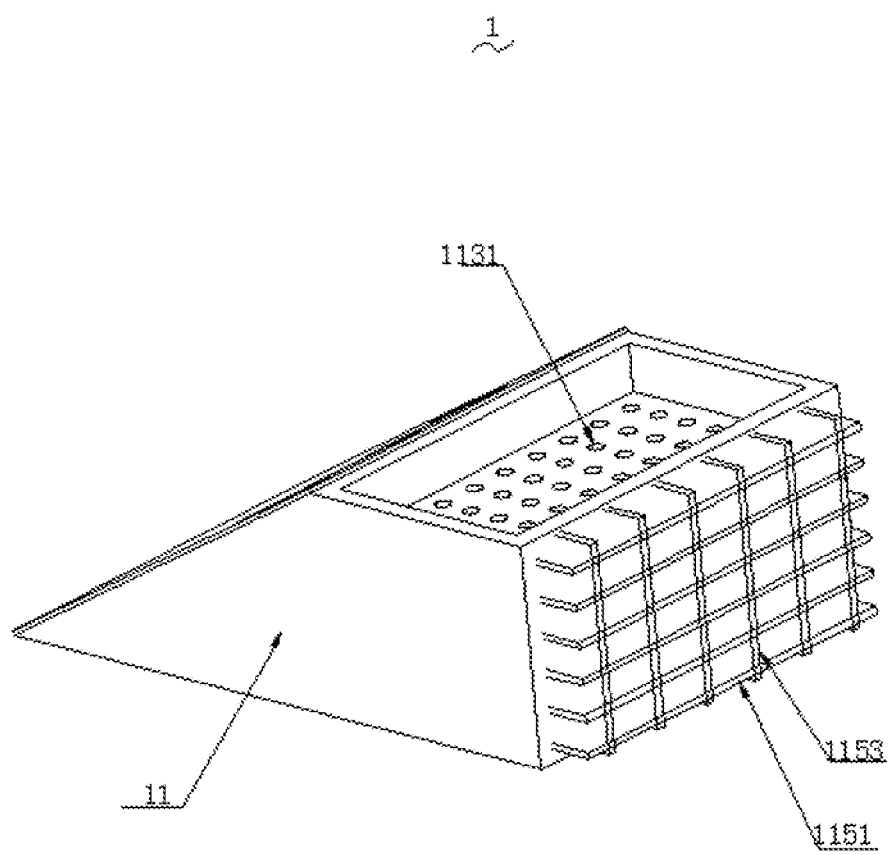
FIG. 2 is a perspective view showing the structural diagram of the low-impact water conserving dam of the present disclosure.
Figure 3:
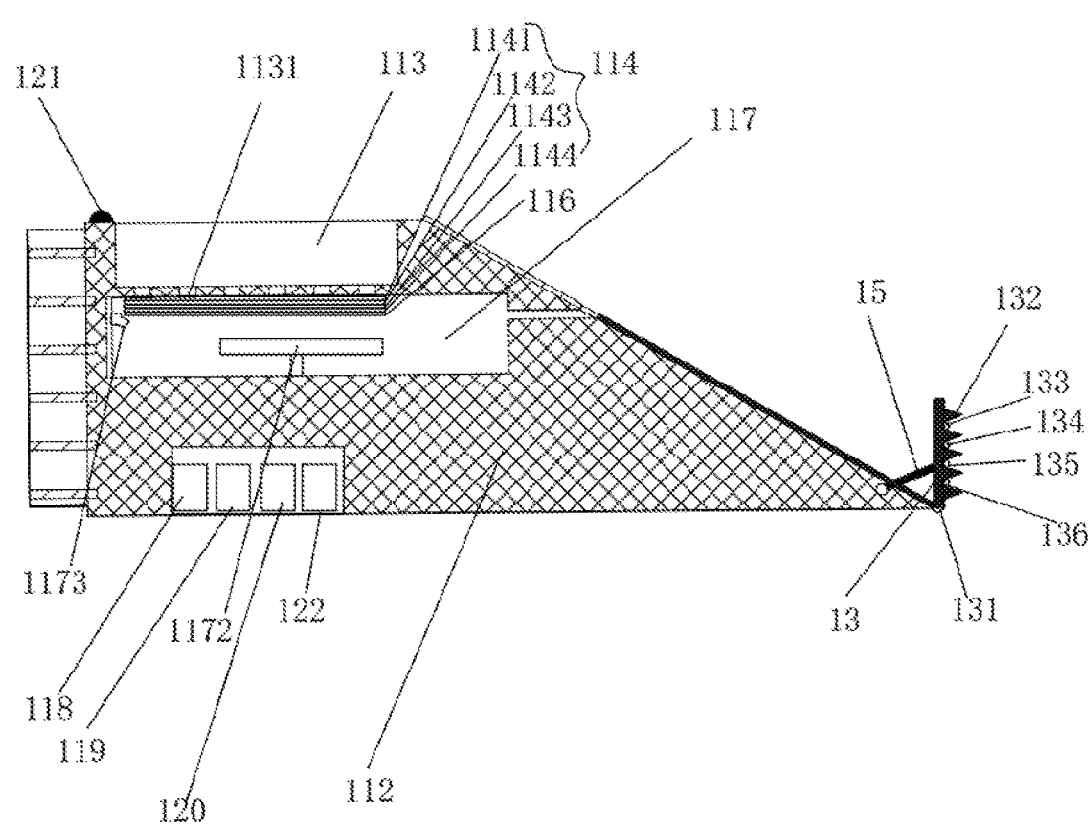
FIG. 3 is a cross-sectional view showing the structure diagram of the low-impact water conserving dam of the present disclosure.

As shown in FIG. 1 to FIG. 3, the present disclosure of the low-impact water conserving dam 1 comprises a dam body 11 and reinforcing ribs 115 arranged on a rear portion of the dam body 11. The reinforcing ribs 115 comprise transverse reinforcing ribs 1151 and vertical reinforcing ribs 1153 interlaced with the transverse reinforcing ribs 1151. The reinforcing ribs are made of metal. A front portion of the dam body 11 is an inclined surface and a rear end of the dam body 11 is a platform surface. A planting bin 113 is arranged on the platform surface of the dam body 11 for planting vegetation and a plurality of water flow through holes 1131 are arranged in a matrix manner at a bottom of the planting bin 113. The low-impact water conserving dam 1 further comprises a water storage bin 117 arranged in an interior of the dam body 11. The water flow through holes 1131 arranged at the bottom of the planting bin 113 are communicated with the water storage bin 117. A water drainage channel 111 is formed in a middle upper portion of the inclined surface of the dam body 11, and the water drainage channel 111 is communicated with the water storage bin 117. The interior of the dam body 11 is filled with gravel material 112. A plurality of filter plates 114 and polyvinyl chloride (PVC) filter layers 116 are arranged in an interior of the water storage bin 117, and the filter plates 114 and PVC filter layers 116 are used to filter the water source from the planting bin 113. The filter plates 114 comprise an activated carbon filter plate 1141, a quartz sand filter plate 1142, a sponge filter plate 1143, and an anthracite filter plate 1144. Thicknesses of the activated carbon filter plate 1141, the quartz sand filter plate 1142 the sponge filter plate 1143, and the anthracite filter plate 1144 sequentially increases. The thickness of the activated carbon filter plate 1141 ranges from 1.5 cm to 3.5 cm. The thickness of the quartz sand filter plate 1142 ranges from 4.6 cm to 6.5 cm. The thickness of the sponge filter plate 1143 ranges from 7.2 cm to 8.3 cm. The thickness of the anthracite filter plate 1144 ranges from 8.9 cm to 10.5 cm. The inclined-angle of the inclined surface of the front portion of the dam body 11 ranges from 25 degrees to 45 degrees. An aperture of each the water flow through holes 1131 arranged in a matrix manner at the bottom of the planting bin 113 ranges 1.2 cm to 5 cm. The low-impact water conserving dam 1 further comprises an anti-impact plate 13 arranged on a bottom side of the inclined surface of the dam body 11. A rotating shaft 131 is connected with a bottom portion of the anti-impact plate 13. A hydraulic drive cylinder 15 is arranged on an upper portion of the anti-impact plate 13 and the hydraulic drive cylinder 15 is used to push the anti-impact plate to rotate. The anti-impact plate rotates around the rotating shaft 131. The low-impact water conserving dam 1 further comprises a controller 118, a wireless communication unit 119, a data memory 120, an alertor 121, and a temperature sensor 122. The hydraulic drive cylinder 15, the wireless communication unit 119, the data memory 120, the alertor 121, and the temperature sensor 122 are electrically connected with the controller 118. A water pressure sensor 133 and an infrared sensor 134 are arranged on a front surface of the anti-impact plate 13 to sense water flow impact pressure in real time. The water pressure sensor 133 and the infrared sensor 134 are electrically connected with the controller 118. The anti-impact plate 13 is made of metal and a thickness of the anti-impact plate 13 ranges from 5 cm to 10 cm. A plurality of sharp bulges 132 arranged in a matrix manner are integrally molded with the front surface of the anti-impact plate 13. A height of the dam body 11 ranges from 1.5 m to 2.5 m. A high-definition waterproof camera 135 and a water quality detecting instrument 136 are arranged on the anti-impact plate. The high-definition waterproof camera 135 and the water quality detecting instrument 136 are electrically connected with the controller 118. An agitator 1172 and a high-pressure water spray head 1173 are arranged on the interior of the water storage bin 117. The agitator 1172 and the high-pressure water spray head 1173 are electrically connected with the controller 118.

The low-impact water conserving dam 1 comprises the dam body 11 and reinforcing ribs 115 arranged on the rear portion of the dam body 11. The reinforcing ribs 115 comprise transverse reinforcing ribs 1151 and vertical reinforcing ribs 1153 interlaced with the transverse reinforcing ribs 1151. The planting bin 113 is arranged on the platform surface of the dam body 11 for planting vegetation. The water storage bin 117 is arranged in the interior of the dam body 11. In actual use, the low-impact water conserving dam 1 is able to greatly improve service life, and has rich functions and can meet various requirements. The reinforcing ribs 115 on the rear portion of the dam body 11 is able to significantly improve the overall strength and enhance use.

Furthermore, a plurality of layers of planting plates are stacked in the planting bin 117. The planting plates are movably connected with a planting bin wall through clamping blocks arranged around each planting plate. A plurality of planting plate water drainage holes are arranged on each planting plate to drain away the water and an aperture of the planting plate water drainage hole ranges from 1 cm to 5 cm.

Furthermore, the transverse reinforcing ribs 1151 and the vertical reinforcing ribs 1153 are interlaced in a vertical direction.

Furthermore, height difference between a bottom of a bin body of the water storage bin 117 and an uppermost surface of the dam body 11 is from 60 cm to 80 cm.

Furthermore, a depth of a bin body of the planting bin 117 ranges from 20 cm to 50 cm.

Furthermore, thickness of the transverse reinforcing ribs 11151 and the vertical reinforcing ribs 1153 ranges 10 cm to 25 cm.

Compared with the prior art, the present disclosure of the low-impact water conserving dam 1 comprises the dam body 11 and reinforcing ribs 115 arranged on the rear portion of the dam body 11. The reinforcing ribs 115 comprise transverse reinforcing ribs 1151 and vertical reinforcing ribs 1153 interlaced with the transverse reinforcing ribs 1151. The planting bin 113 is arranged on the platform surface of the dam body 11 for planting vegetation. The water storage bin 117 is arranged in the interior of the dam body 11. In actual use, the low-impact water conserving dam 1 is able to greatly improve the service life, and has rich functions and can meet various requirements. The reinforcing ribs 115 on the rear portion of the dam body 11 is able to significantly improve the overall strength and enhance ruse.

The above-described embodiments of the present disclosure are not to be construed as limiting the scope of the present disclosure. Any of the modifications, equivalent replacement, and improvement within the spirit and principle of the present disclosure should fall within the protection scope of the claims

What is claimed is:
1. A low-impact water conserving dam, comprising a dam body, and reinforcing ribs arranged on a rear portion of the dam body;

wherein the reinforcing ribs comprise transverse reinforcing ribs and vertical reinforcing ribs interlaced with the transverse reinforcing ribs; the reinforcing ribs are made of metal; a front portion of the dam body is an inclined surface and a rear end of the dam body is a platform surface;

wherein a planting bin is arranged on the platform surface of the dam body for planting vegetation; a plurality of water flow through holes are arranged in a matrix manner at a bottom of the planting bin; the low-impact water conserving dam further comprises a water storage bin arranged in an interior of the dam body; the water flow through holes arranged at the bottom of the planting bin are communicated with the water storage bin; a water drainage channel is formed in a middle upper portion of the inclined surface of the dam body, and the water drainage channel is communicated with the water storage bin; the interior of the dam body is filled with gravel material; a plurality of filter plates and polyvinyl chloride (PVC) filter layers are arranged in an interior of the water storage bin and the filter plates and PVC filter layers filter the water source from the planting bin; the filter plates comprise an activated carbon filter plate, a quartz sand filter plate, a sponge filter plate and an anthracite filter plate; and thickness of the activated carbon filter plate, the quartz sand filter plate, the sponge filter plate, and the anthracite filter plate sequentially increases; thickness of the activated carbon filter plate ranges from 1.5 cm to 3.5 cm; thickness of the quartz sand filter plate ranges from 4.6 cm to 6.5 cm; thickness of the sponge filter plate ranges from 7.2 cm to 8.3 cm; thickness of the anthracite filter plate ranges from 8.9 cm to 10.5 cm; inclined-angle of the inclined surface of the front portion of the dam body ranges from 25 degrees to 45 degrees; and an aperture of each the water flow through hole arranged in a matrix manner at the bottom of the planting bin ranges from 1.2 cm to 5 cm;

wherein the low-impact water conserving dam further comprises an anti-impact plate arranged on a bottom side of the inclined surface of the dam body; a rotating shaft is connected with a bottom portion of the anti-impact plate; a hydraulic drive cylinder is arranged on an upper portion of the anti-impact plate and the hydraulic drive cylinder pushes the anti-impact plate to rotate; the anti-impact plate rotates around the rotating shaft, wherein the low-impact water conserving dam further comprises a controller, a wireless communication Unit, a data memory, an alertor and a temperature sensor; the hydraulic drive cylinder, the wireless communication unit, the data memory, the alertor and the temperature sensor are electrically connected with the controller; a water pressure sensor and an infrared sensor are arranged on a front surface of the anti-impact plate to sense water flow impact pressure in real time; the water pressure sensor and the infrared sensor are electrically connected with the controller; the anti-impact plate is made of metal and a thickness of the anti-impact plate ranges from 5 cm to 10 cm; a plurality of sharp bulges arranged in a matrix manner are integrally molded with the front surface of the anti-impact plate; height of the dike dam body ranges from 1.5 m to 2.5 m; a high-definition waterproof camera and a water quality detecting instrument are arranged on the anti-impact plate; the high-definition waterproof camera and the water quality detecting instrument are electrically connected with the controller; an agitator and a high-pressure water spray head are arranged on the interior of the water storage bin; and the agitator, and the high-pressure water spray head are electrically connected with the controller.

2. The low-impact water conserving dam according to claim 1, wherein a plurality of layers of planting plates are stacked in the planting bin; the planting plates are movably connected with a planting bin wall through clamping blocks arranged around each planting plate; a plurality of planting plate water drainage holes are arranged on each the planting plate to drain away the water; an aperture of the planting plate water drainage hole ranges from 1 cm to 5 cm.

3. The low-impact water conserving dam according to claim 1, wherein the transverse reinforcing ribs and the vertical reinforcing ribs are interlaced in a vertical direction.

4. The low-impact water conserving dam according to claim 1, wherein height difference between a bottom of a bin body of the water storage bin and an uppermost surface of the dam body is from 60 cm to 80 cm.

5. The low-impact water conserving dam according to claim 1, wherein a depth of a bin body of the planting bin ranges from 20 cm to 50 cm.

6. The low-impact water conserving dam according to claim 1, wherein thickness of the transverse reinforcing ribs and the vertical reinforcing ribs ranges from 10 cm to 25 cm.

* * * * *